Oct. 16, 1934.  W. C. MAYNARD  1,977,003
LURE
Filed Dec. 27, 1933

W. C. Maynard Inventor
By C. A. Snow & Co.
Attorneys.

Patented Oct. 16, 1934

1,977,003

UNITED STATES PATENT OFFICE 1,977,003

LURE

William C. Maynard, Coral Gables, Fla.

Application December 27, 1933, Serial No. 704,173

5 Claims. (Cl. 43—45)

This invention relates to fishing lures of the same type as disclosed in my Patent No. 1,925,197, dated September 5, 1933.

It is an object of the present invention to provide a lure with an angularly adjustable fin which can be so positioned as to cause the lure to spin either in a clockwise or a counterclockwise direction as desired.

Another object is to provide a lure which is cheap to manufacture and is formed of few parts so that it will not readily get out of order.

A still further object is to provide an improved means for attaching the hook to the lure.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred forms of the invention have been shown.

In said drawing

Figure 1:
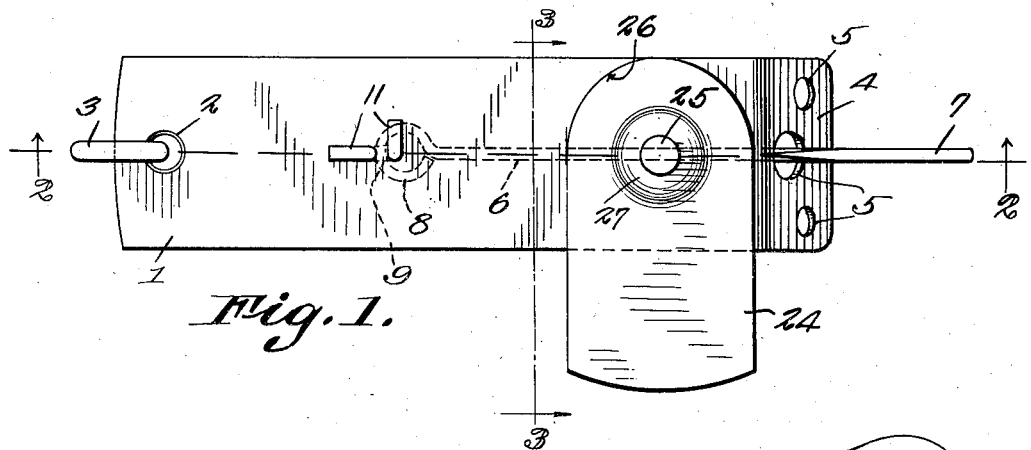
Figure 1 is a plan view of a lure embodying the present improvements.
Figure 2:
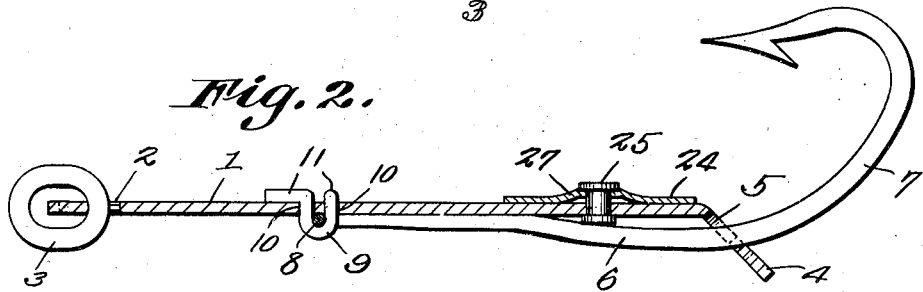
Figure 2 is a section on line 2—2 Figure 1.

Referring to the figures by characters of reference 1 designates an elongated flat plate constituting the body of the lure, the forward end being provided with an opening 2 for receiving an attaching link 3 while the back end of the plate is offset downwardly to form an inclined deflecting wing 4 provided with one or more openings 5.

Hooks of different kinds may be connected to the plate 1. For example, and as shown in Figures 1 to 4 inclusive, the shank 6 of a hook 7 can be extended through one of the openings 5 and longitudinally along the bottom surface of the plate.

This shank terminates in an eye 8 which is held to the plate 1 by a staple 9 the end portions of which are extended through openings 10 in the plate and are bent downwardly onto the plate as shown for example at 11 in Figure 1.

Figure 5:
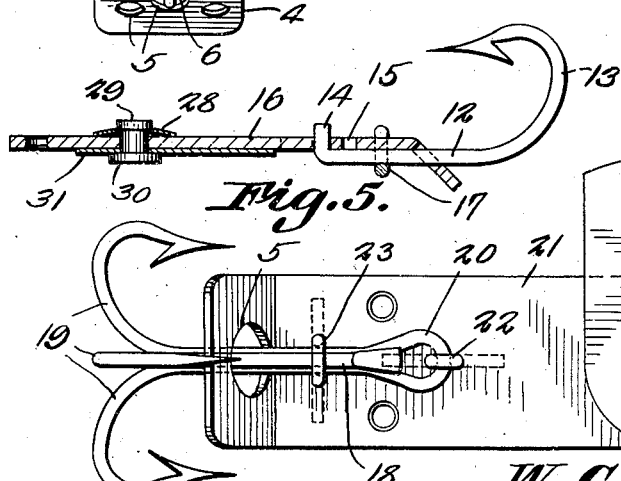
Figure 5 is a longitudinal section through a modified form of lure.

It is to be understood that, as illustrated in Figure 5, the shank 12 of a hook 13 can be formed at its free end with an upturned lug 14 seated in one of a series of openings 15 in plate 16 and a staple 17 can be employed for holding the shank to the plate. With such an arrangement the shank can be adjusted longitudinally by placing its lug in different openings.

Figure 6:
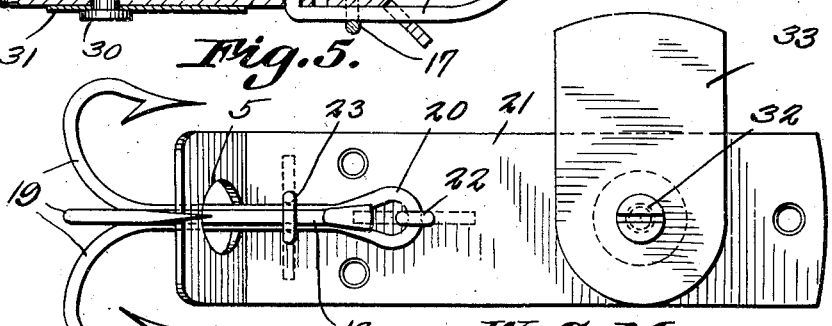
Figure 6 is a plan view illustrating another form.

A still further hook arrangement has been illustrated in Figure 6 wherein the shank 18 of a gang hook 19 is provided with an eye 20 held to plate 21 by a staple 22 while another staple 23 embraces the shank 18 and holds it to the plate.

For the purpose of controlling the spinning action of the lure there is provided a short flat plate 24 which is joined to the plate by a pivot stud or rivet 25. This fin is mounted on top of plate 1 and is adapted to be swung relative thereto so as to extend laterally from either side of the plate 1. One end of the fin is so shaped and proportioned as at 26 that it will not at any time project beyond plate 1.

The pivot stud or rivet 25 holds the plate adjacent to the offset end 4 and in order that desirable frictional contact between the fin and plate 1 may be maintained, the said fin can be offset as at 27 where engaged by the stud or rivet so that there will be a certain amount of resiliency at this point to insure a firm working contact between the plates. However, if preferred, a resilient washer 28 can be used as shown in Figure 5. By referring to said figure it will be seen that washer 28 is interposed between plate 16 and one end of the pivot stud or rivet 29 so that the head 30 on the other end will bind upon the fin 31.

A still further modification is illustrated in Figure 6 where a screw 32 serves as the pivotal member and is adjustable to hold the pivot 33 to any angle at which it may move.

Obviously other modifications of this structure can be used within the scope of the claims.

Figure 3:
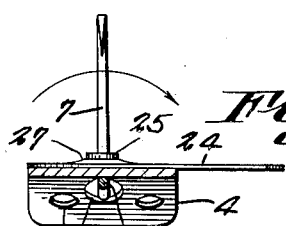
Figure 3 is a reduced section on line 3—3 Figure 1, the fin being in position to cause a clockwise spinning of the lure as indicated by the arrow.
Figure 4:
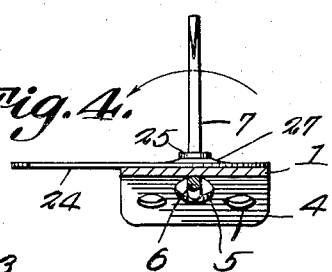
Figure 4 is a view similar to Figure 3 showing the fin adjusted to a position opposite to that shown in Figure 3 so that the lure will spin in a counterclockwise direction as indicated by the arrow.

In practice, should it be desired to impart a clockwise spinning motion to the lure, the fin 24 would be extended to the right as shown in Figures 1 and 3. Thus the forward movement of the lure within a body of water would cause the water to act on wing 4 so as to force the lure into an inclined position while at the same time plate 24 will be inclined so that the pressure of water thereagainst would cause the lure to spin in a clockwise direction. If, by any chance, the line attached to link 3 should become twisted as a result of this spinning action, the twist could be removed simply by shifting the fin so as to extend in the opposite direction as illustrated in Figure 4, thereby to set up a counterclockwise spinning action.

It is to be understood that there is a sufficient frictional contact between the body portion of the lure and its fin under all conditions of use to maintain them in the relative positions to which they are adjusted.

What is claimed is:

1. A lure including a body plate, a deflecting element at one end thereof, a hook connected thereto, a fin pivotally mounted on the plate and adapted to extend laterally from either side thereof to produce a clockwise or counterclockwise spinning action when the lure is drawn through a body of water, and means for maintaining a frictional contact between the plate and fin sufficient to hold them against relative movement while in use.

2. A lure including a body plate, a deflecting element at one end thereof, a hook connected thereto, a fin pivotally mounted on the plate and adapted to extend laterally from either side thereof to produce a clockwise or counterclockwise spinning action when the lure is drawn through a body of water, and means for maintaining a frictional contact between the plate and fin sufficient to hold them against relative movement while in use, said means including a resilient portion and a pivotal fin connection extending through the body plate and the resilient portion.

3. A lure including a flat body plate having a downwardly offset back end, a hook having its shank extending forwardly through said end, means for attaching the shank to the plate, a fin mounted on the plate adjacent to said end, a pivotal connection between the fin and plate, and resilient means cooperating with said connection for holding the fin in any position to which it may be adjusted angularly relative to the plate, said fin being of such length as to project beyond either side of the body plate when positioned at right angles thereto.

4. A lure including a body plate, a hook connected thereto and frictionally held means adjustably connected to the plate for causing said plate to spin in either a clockwise or a counterclockwise direction when drawn through a body of water.

5. A lure including a body plate, a hook connected thereto and frictionally held means adjustably connected to the plate for causing said plate to spin in either a clockwise or a counterclockwise direction when drawn through a body of water, said means being shiftable to an intermediate inactive position upon and longitudinally of the body plate.

WILLIAM C. MAYNARD.